United States Patent [19]

Rostaing et al.

[11] Patent Number: 5,350,605
[45] Date of Patent: Sep. 27, 1994

[54] PROCESS FOR THE PREPARATION OF AN OPTICAL STRUCTURE AND OPTICAL STRUCTURE OBTAINED THEREBY

[75] Inventors: Jean-Christophe Rostaing, Versailles; Francois Coeuret, Guyancourt, both of France

[73] Assignee: l'Air Liquide, Societe Anonyme pour l'Etude et l'Exploitation des Procedes Georges Claude, Paris, France

[21] Appl. No.: 148,422

[22] Filed: Nov. 8, 1993

Related U.S. Application Data

[63] Continuation-in-part of Ser. No. 897,625, Jun. 12, 1992, abandoned.

[30] Foreign Application Priority Data

Jun. 12, 1991 [FR] France .................................. 91 07140

[51] Int. Cl.$^5$ ................................................. B05D 5/06
[52] U.S. Cl. .................................... 427/536; 427/569; 427/162; 427/164; 427/255.1; 427/322; 427/419.2
[58] Field of Search ............... 427/162, 164, 569, 536, 427/322, 255.1

[56] References Cited

U.S. PATENT DOCUMENTS

| | | | |
|---|---|---|---|
| 4,927,704 | 5/1990 | Reed et al. | 428/221 |
| 5,093,152 | 3/1992 | Bonet et al. | 427/575 |

FOREIGN PATENT DOCUMENTS

| | | |
|---|---|---|
| 0254205 | 7/1986 | European Pat. Off. . |
| 0291113 | 11/1988 | European Pat. Off. . |
| 8808439 | 11/1988 | World Int. Prop. O. . |

Primary Examiner—Shrive Beck
Assistant Examiner—David M. Maiorana
Attorney, Agent, or Firm—Browdy and Neimark

[57] ABSTRACT

The invention concerns the preparation of an optical structure. On a polymeric substrate there is first provided a surface activation, and the deposit of a layer of $SiO_2$, 2000 Å thick after which there is a deposit of a plurality of functional layers and finally a deposit of $SiO_2$, 3 microns thick followed by a deposit of $Si_3N_4$/$SiO_xN_y$ 3 microns thick, the latter being produced under radio-frequency polarization. The thus obtained optical structure has properties of adhesiveness, resistance to abrasion and to thermal impacts.

15 Claims, 2 Drawing Sheets

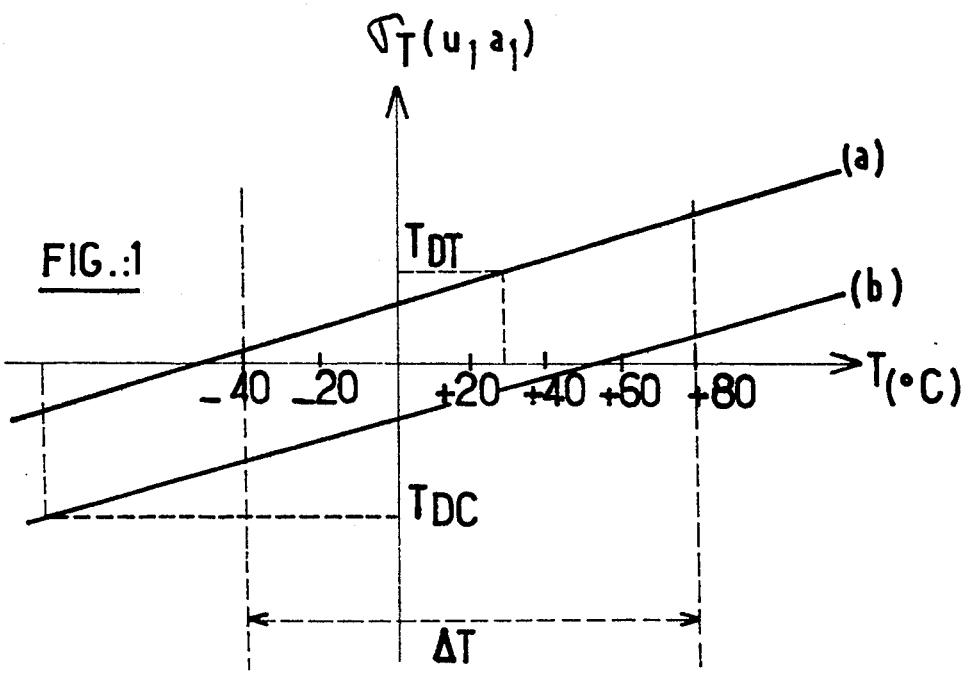
FIG.:1
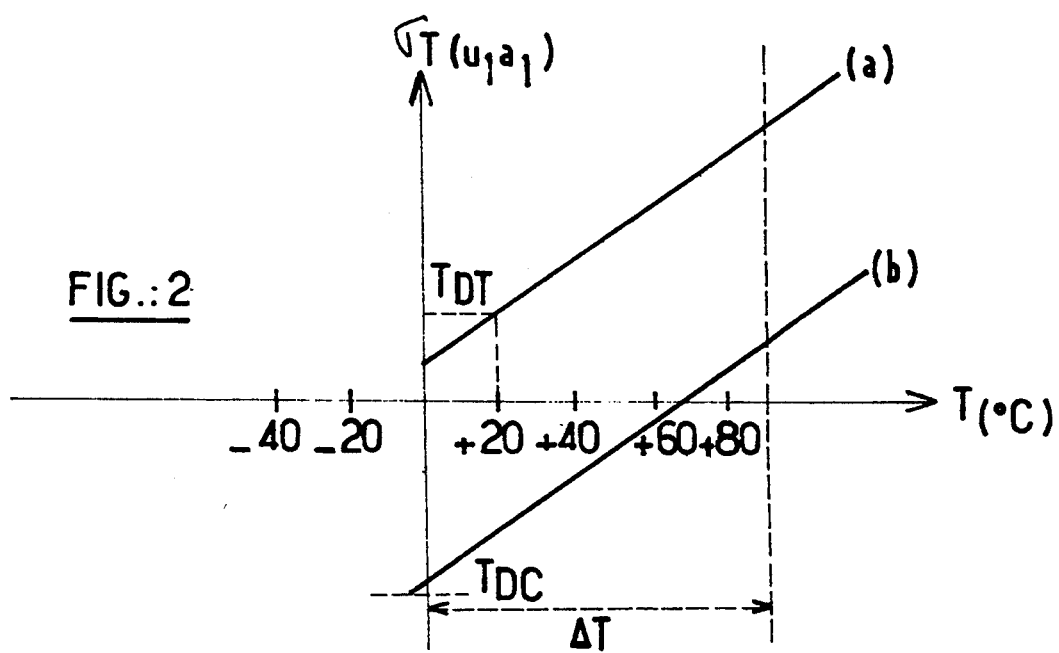
FIG.:2

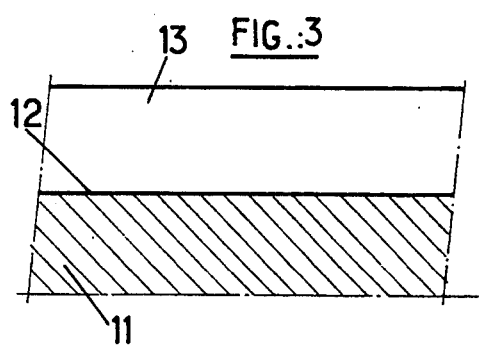
FIG.:3
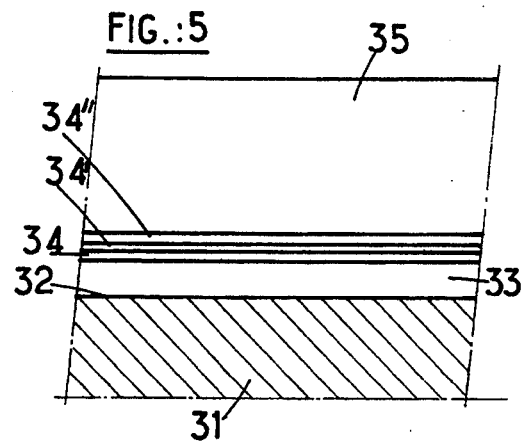
FIG.:5
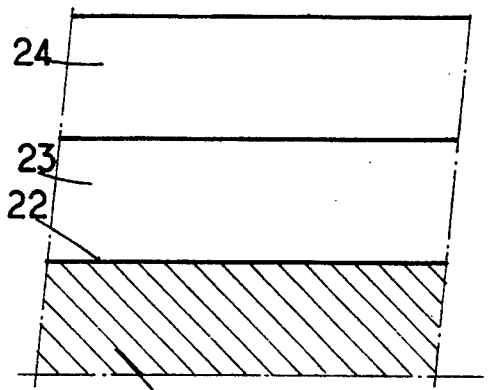
FIG.:4
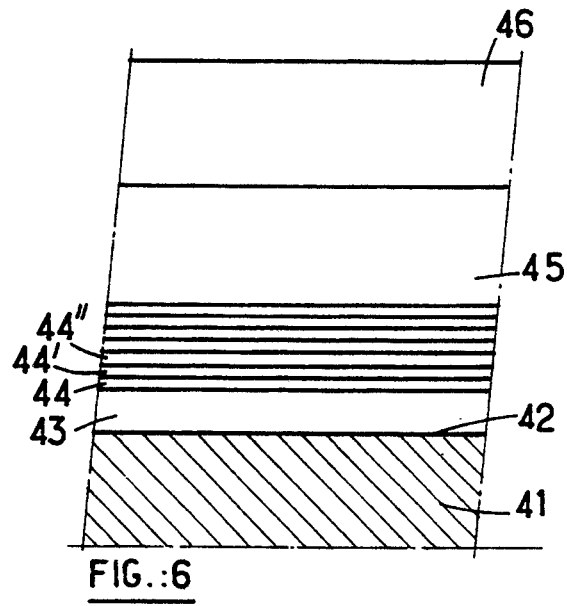
FIG.:6

PROCESS FOR THE PREPARATION OF AN OPTICAL STRUCTURE AND OPTICAL STRUCTURE OBTAINED THEREBY

This application is a continuation-in-part, of application Ser. No. 07/897,625, filed Jun. 12, 1992, now abandoned.

BACKGROUND OF INVENTION

1. Field of the Invention

The invention concerns the preparation of an optical structure based on optical polymer substrate.

2. Description of Prior Art

Optical polymers are increasingly used to replace glass or for specific new applications. This interest originates first of all because of the facility with which they may be shaped, and also in view of their lightness and possibly their impact resistance. However, they have the disadvantage of showing relatively poor resistance to mechanical wear, as well as against certain agents causing physical and chemical degradation under their conditions of use. Their surface must therefore be protected by means of hard transparent coatings.

In some cases, in addition, there should be provided coatings which are capable of giving optical properties to the finished product, which involve both the specific properties of the film and its interaction with the substrate, for example mechanical behavior at the interface.

The requirements which are the most generally called for by the users concern:
  adhesiveness,
  abrasion resistance, for example in view of maintaining optical properties,
  resistance to cycling and thermal impacts,
  inertia towards certain atmospheric or chemical agents, depending on the application under consideration.

Optical specifications may consist of a simple criterion of transparency in the visible range or may include more complex properties.

Some polymers, for example polycarbonate, also undergo an accelerated aging when they are exposed to surrounding ultra-violet radiation (U.V.) under normal conditions of use. When a coating has to be deposited on these polymers, degradation of the interface leads to a still much more rapid deterioration of the product which is accompanied with spectacular delaminations. In such a case, the coating should also filter the U.V. rays.

In a general manner, these optical structures should comply with severe, numerous and diversified accelerated tests, which are more or less specific to the users.

The protective coatings which are normally applied in liquid form are found to offer little flexibility in the modulation of their properties, which are generally imposed by the molecule of the precursor under consideration. It is very difficult to synthesize compounds producing coatings capable of fulfilling all the requirements, and in addition it is naturally impossible to produce other optical properties than simple transparency in the visible range, for example.

Actually, an attempt is being made to replace these liquid solutions with silicon base amorphous inorganic materials, which are deposited from a gaseous phase. Since the use of silane requires certain safety precautions, the first attempts have been made with so-called "plasma polymerization" processes starting from non pyrophoric organosilicon compounds such as hexamethyldisiloxane. The latter is not only a carrier of silicon, but also carries with it the constituent elements of the layer (O, C. H) in a manner which is relatively not easily controllable even by resorting to additional inputs of oxygen ($O_2$).

To this date, the processes of coating according to the so-called chemical coating process in vapor phase which is improved by plasma ("plasma enhanced chemical vapor deposition" referred to hereinbelow by its usual abbreviation "P.E.C.V.D."), starting from silane on polymers, have not nearly exploited the possibilities which were offered. If materials of good hardness are produced ($SiO_2$), the achievement of the properties of adhesiveness and heat resistance always require reliance on a primary adhesive applied by liquid means which greatly reduces the economical interest of the process. Moreover, these coatings ensure only a property of protection, without trying to confer optical properties thereto.

The present invention aims at producing, depending on the different requirements of the users, coatings on polymers which simultaneously posses properties of adhesiveness, heat resistance, physical chemical inertia, and possibly a certain number of optical properties. Even if these properties are excluded, it has been found that generally there is no coating material which can alone comply with these various criteria and the technical solution which has been chosen consequently rests on a multilayer composite structure which is rather complex.

The invention therefore aims at providing a group of layer materials having specific properties on the one hand, on the other hand properties of association with one another and with the polymeric substrate, which permits production of a structure responding to all of required specifications.

The processes of coating "PECVD" starting with independent carriers of various elements ($SiH_4$, $O_2$, $N_2$, $C_2H_2$ ...) permits preparation in a flexible and well controlled manner a large variety of amorphous alloys of silicon. It is often possible, for a given material, to optimize one or more properties, for example the following:
  —adhesiveness
  —thermomechanical behavior
  —abrasion resistance
  —optical properties
  —physicochemical inertia.

This distinction is quite arbitrary, because, for example, it is obvious that adhesiveness is associated with thermomechanical properties.

Similarly, tests of abrasion are an indication not only of the specific hardness of the layer, but also in a certain measure, of the adhesiveness when abrasive particles of important size have a tendency to stratch in depth, even remove the layer. The physicochemical inertia may also depend on the properties at the materials of the films as well as those of the interfaces.

However, it is possible to attribute a main function to each level of layer.

SUMMARY OF INVENTION

Better results have been obtained according to the invention, in a process where there is produced on an optical polymeric substrate, a coating based on a silicon alloy by utilizing at least the following operating steps:

a) a plasma treatment for activation of the surface of the substrate, based on a gaseous mixture containing argon;

b) at least one hard layer is deposited by said PECVD technique from silane and oxygen, so as to produce a film on $SiO_2$, having a thickness of the order of 2 to 5 microns.

Upon consideration of the aspect of adhesiveness, which essentially results from the nature of the substrate, the preparation of its surface, the composition and the micro-structure of the material in contact with the polymer, it will appear that the amorphous alloys of silicon adhere poorly on a polymeric surface which has no specific preparation. To ensure a good cohesion, a treatment of activation of the surface is therefore carried out, with the additional requirement for optical materials to respect the transparency of the interface, and the treatment is a treatment by plasma used on the other hand in the ulterior phases of the process according to the invention. The choice of gases and parameters of the process depends on the polymer under consideration. This treatment of the surface of the substrate for the process of the present invention is by electrically biasing, or electrically polarizing, the substrate.

While "PMMA" and its imide grafted derivative "KAMAX TM" support without damage a very strongly oxidizing plasma ($Ar/O_2$ for example), the polycarbonate is rapidly degraded by the latter with partial carbonization and appearance of a brownish color. In return, the polycarbonate is not optically degraded by a treatment with argon followed by argon/ammonia, as described in patents FR 2614317 and FR 2631346. This process has been optimized for polycarbonate, but also gives excellent results with polystyrene, "ABS" and "CR 39". The performances are not as good with "PMMA" and "KAMAX TM", for which a plasma $Ar/O_2$ is preferred.

It has been realized that the mere deposit of a hard structural layer of $SiO_2$ for example on an activated substrate as previously indicated, adheres but is not degraded at the start of the thermal tests. The thermomechanical behavior surely depends on characteristics of the hard layer, but it has been established that it is impossible to meet the tests without relying on an intermediate layer. According to the invention, a deposit of a layer by PECVD is provided solely from silane and a plasmagenic or diluent gas (Ar, He), of about 100 Å thickness. The material which is deposited may not be considered to be hydrogenated amorphous silicon, since the polymeric substrate chemically interacts with the layer during growth and takes part in its composition. The film remains however rich in silicon, but because of its small thickness, no parasite optical absorption in the visible range can be observed.

This intermediate layer may in particular be produced in a micro-wave plasma in post-discharge, according to the process described in the patent FR 2631346.

Other intermediate layers may be required to satisfy the thermal tests depending on the characteristics of the other components of the stacking.

In general, the layers ensuring an optical function have characteristics which are not compatible with their simultaneous use as hard protective layers. The stacking with optical function, if any, is therefore prepared after the adhesive layers and before the deposit of the hard structural layer(s). It should be noted that the latter have some influence on the transmission function of the complete system, which is naturally taken into account when designing the optical layers.

As an example of optical function, low-pass filters with abrupt cut may be mentioned. One of their applications, although, truly speaking it is not a question of an optical property of the product, is the protection of a substrate of polycarbonate against UV radiation.

The choice of the material of the hard layer is obviously determined by considerations of hardness, but also in view of the thermomechanical property and physicochemical inertia. The composition on the other hand is not the only one of concern, at the mode of preparation may also considerably influence the microstructure.

As previously mentioned, degradation of the coatings following strong thermal variations (many tens of degrees) results from important stresses which are generated from the very high dissymmetry of the thermal expansion coefficients of the layer and the substrate. When the sample is heated with respect to the ambient air, the stress increases in tensive direction with a risk of degradation of the type which forms cracks and/or crackling. On the contrary, when the sample is cooled, the stress changes in the compressive direction which, beyond a certain level, may lead to extensive detachments or to a "bursting" of the film.

The occurrence of degradations during a given test mainly depends, although not exclusively, on the one hand on the maximum level of the stress reached in each direction and on the other hand of the properties of mechanical resistance of the layers and the interfaces constituting the coating.

The first aspect is settled by the values of coeffients of dilatation and modules of elasticity, as well as intrinsic stresses.

The second aspect is influenced not only by the nature and the composition of the materials, but also by their micro-structure and that at their interfaces. It is intuitively believed that a granular and discontinuous structure promotes the initiation of ruptures. In a general manner, the films which are deposited at room temperature without ionic bombardment have a structure which is clearly marbled resulting from an insufficient rearrangement of the atoms of the layer during growth.

However, the fine influence of the micro structure in the mechanisms of degradation has not to this date been clearly established. First, it seems that the results in terms of thermomechanical property are spectacularly improved by controlling specific stresses, also via ionic bombardment.

To simplify, the ionic bombardment enables one to adjust the level of the specific compressive stress (i.e. measured at deposit temperature), so as to effect a "translation of origin". In this manner, the amplitude of the total stress (specific and thermal) may be maintained during the test within limits which are compatible with the integrity of the structure.

The value of this "correction" of stress depends on the characteristics of the material of the layer, its specific stress in the absence of ionic bombardment and the temperature range covered during the test.

BRIEF DESCRIPTION OF THE DRAWINGS

FIG. 1 is a graph showing the stress of a deposited film according to the invention.

FIG. 2 is a graph showing the stress of a deposited film according to the invention.

FIG. 3 is a cross-section of the deposited films according to the invention.

FIG. 4 is a cross-section of the deposited films according to the invention.

FIG. 5 is a cross-section of the deposited films according to the invention.

FIG. 6 is a cross-section of the deposited films according to the invention.

DESCRIPTION OF THE PREFERRED EMBODIMENTS

The principle of obtaining samples which resist thermal cyclings by adjustment of the specific stresses is illustrated in FIGS. 1 and 2, where the qualitative variations of the total stress (specific+thermal) of a film deposited without (a) and with (b) radio frequency polarization. $\sigma_t$ in ordinate is counted positively in the tensive direction.

$T_{DT}$ and $T_{DC}$ represent average temperatures of degradation of the samples by excess of tensive and compressive stress, respectively.

$\Delta T$ is the extension of the range of temperature tests.

FIG. 1 corresponds to the case of the deposit of a mono-layer, for example silicon nitride $Si_3N_4$, on a polycarbonate substrate, the thermal test being of the type in force in the automobile industry ($-40°$ C., $+80°$ C.).

FIG. 2 concerns the same type of film deposited on a substrate of CR39, whose coefficient of thermal expansion is about twice as high as that of polycarbonate. The thermal test under consideration, used in certain optical industries, lies within a different temperature range ($0.90°$ C.).

In both cases, it will easily be understood how the adjustment of the specific stresses enables one to remain within limits of degradation during the thermal test.

Practical feasibility first implies a certain degree of independence between the control of the ionic bombardment and that of the production of the precursors of the deposit.

The invention is based on the consideration of three types of materials of hard layer: silicon oxide, nitride, oxynitride. These materials are called nearly-stoichiometric. There may be an ambiguity in the sense that they contain substantial quantities of hydrogen. This ambiguity may however be removed by establishing that the materials in question contain a very low proportion of Si—Si bonds, which in any case are without any influence on the useful and very difficult to measure properties.

Silica $SiO_2$: H is recommended for the applications that do not require a very great hardness. Without utilizing a radio-frequency (RF) biasing of the substrate the material which is deposited is neutral or moderately compressive and has excellent thermomechanical properties. The physicochemical inertia is also excellent.

The hydrogenated amorphous silicon nitride $Si_3N_4$: H has a high hardness, but the material deposited is, naturally, quite strongly tensive and its thermomechanical behavior is mediocre.

It is also noted that the wavy material is not very resistant to saline mist.

Ionic bombardment enables one on the one hand to correct the stresses in the compressive direction and on the other hand to improve the micro structure until the wavy aspect completely disappears. As a matter of fact, the thermomechanical properties appear to be really excellent if a bi-layer is produced by interposing a film of $SiO_2$ of the previously mentioned type between the adhesive layer and the nitride.

In this case, the coating obtained shows the same performances as that of $SiO_2$ alone. Chemical inertia, its behavior in humid and saline are in environment are in particular substantially improved.

However, silicon nitride has the disadvantage of a high refractive index which increases the visibility of the interference figures in case of a thickness which is not homogeneous. Materials whose hardness is close to that of the nitride may be obtained, however, with a lower index, by incorporating a certain quantity of oxygen, which in addition may also act to control the stresses. In particular, an oxynitride which is deposited without polarization of the substrate may possess excellent thermomechanical properties. One silicon nitride that may be used for the silicon nitride layer is $SiN_yH_z$.

Silicon oxynitride therefore appears as an intermediate solution, in particular in the cases where radio-frequency biasing of the substrate is hardly applicable (objects of complex warping shape). It should also be noted that it may be degraded by a saline mist.

According to a proposal of the invention, the film of $SiO_2$ is coated with a film, according to said PECVD technique and under radio-frequency biasing of the substrate, from oxygen and silicon nitride, so as to produce a complex film of intermediate composition between $SiO_2$ and $Si_3N_4$, with a minimum of Si—Si bonds.

Some examples of applications are given hereinafter.

In what follows, the process parameters which may be mentioned relate to a reactor of a micro-wave laboratory post-discharge designed by AIR LIQUIDE.

The process is particularly applicable to polycarbonate (PC), but it also gives good results with other optical polymers, in particular, polysterene, ABS, CR39, PMMA and KAMAX TM. It comprises sequentially the following operations:
- a pretreatment with Ar, then Ar/NH$_3$,
- deposit of an adhesive layer rich in silicon from SiH$_4$ and Ar, of a thickness of about 100 Å,
- deposit of a hard structural layer $SiO_2$, having a thickness of 3 to 5 μm.

With PMMA and KAMAX TM, the pretreatment preferably consists of a plasma Ar/O$_2$.

The tests consist of 10 thermal cycles in dry atmosphere $+25°$ C.$\rightarrow -40°$ C.$\rightarrow +80°$ C.$\rightarrow +25°$ C. at $2°$ C./min, then 10 other cycles in an atmosphere which is saturated with humidity. The result is positive with PC, PMMA, KAMAX, CR39. The samples of PC additionally resist 3 thermal impacts $-40°$ C.$\rightarrow +80°$ C.

For the hard bi-layer coatings of silica and nitride, the respective thicknesses of the two films depend on the specifications in terms of resistance to abrasion as well as thermomechanical behavior. In the majority of cases, the thickness of $SiO_2$ is 2 to 3 μm, as well as that of $Si_3N_4$. The design which is more often used, for example for beam glasses or automobile fixed side windows, has a thickness of 3 microns+3 microns.

For ophthalmic glasses, the tests are different and a thickness of $SiO_2$ of 3 μm and a thickness of nitride of 2 μm appear as being the best solution:

The operation is carried out as follows:
- pretreatment Ar/O$_2$ (PMMA, KAMAX TM) or Ar+AR/NH$_3$ (other polymers),
- silicon rich adhesive layer 100 Å,
- intermediate layer $SiO_2$ without biasing of the substrate 2 to 3 μm, —hard structural layer $Si_3N_4$ under biasing of the substrate 2 to 3 μm the polarization RF, with all optical polymers, there are obtained deposits holding 10 dry thermal cycles. With polycarbonate, a coating produced without biasing of the substrate holds also 10 cycles, while a sample manufactured by utilizing biasing of the substrate also resists 3 thermal impacts.

With PMMA and KAMAX TM the deposit without biasing of the substrate also provides samples holding 10 thermal cycles.

The resistance during thermal tests against humidity and immersion is also good.

However, it may prove useful that the film of the final coating be a film deposited from oxygen and nitrogen so as to produce an intermediate composition between $SiO_2$ and $Si_3N_4$ with a minimum of Si—Si bonds.

Whatever the structure of the final film, the radio-frequency biasing of the substrate or the ionic bombardment is determined so as to adjust the compressive stress of the film at room temperature.

FIGS. 3 to 6 are cross-sections of four structures according to the invention:
- According to FIG. 3, on an optical substrate 11, there is provided a surface activation at 12, then a deposit of a film 13 substantially comprising $SiO_2$, and having a thickness of 2 to 3 microns.
- According to FIG. 4, there is provided a surface activation 22 on a substrate 21, then deposits of a first film 23 of $SiO_2$ 3 microns thick, and a second film 24 based on $Si_3N_4/SiO_xN_y$ 3 microns thick.
- According to FIG. 5, there is provided a surface activation at 32 on a substrate 31, then successive deposits of an intermediate layer 33 of $SiO_2$ 2000 Å thick, then a plurality of anti-ultraviolet layers 34, 34' 34" . . . and finally a hardness layer 35 of $SiO_2$ whose thickness is between 3 and 5 microns.
- According to FIG. 6, there is provided a surface activation at 42 on a substrate 41, then successive deposits of an intermediate layer 43, based on $SiO_2$ 2000 Å thick, then a plurality of anti-UV layers 44, 44' 44" . . . then a layer of $SiO_2$ 3 microns thick and finally a layer based on $Si_3N_4/Si_xN_y$ of 3 microns.

It should be understood for purposes of the present invention that "polarization" means "biasing". The biasing contemplated herein is strictly an electrical bias. It can be readily understood that for purposes of the present invention, the biasing, or polarization, refers to electrical biasing rather than optical polarization.

We claim:

1. A process for producing an optical structure comprising a silicon-based coating on an optical polymeric substrate, comprising the following consecutive steps:
   (a) plasma-activating a surface of the substrate with plasma based upon a gaseous mixture containing argon to form an activated surface;
   (b) depositing a first layer of $SiO_2$ onto the activated surface by a plasma enhanced chemical vapor deposition technique from silane and oxygen to form a first layer having a thickness of from about 2 to 5 microns;
   (c) coating said first layer by a plasma enhanced chemical vapor deposition technique while the substrate is subjected to radio-frequency biasing with a second layer formed of a silicon nitride.

2. The process for producing an optical structure comprising a silicon-based coating on an optical polymeric substrate, comprising the following consecutive steps:
   (a) plasma-activating a surface of the substrate with a plasma based upon a gaseous mixture containing argon to form a plasma-activated surface;
   (b) depositing a first layer of $SiO_2$ onto the activated surface by plasma enhanced chemical vapor deposition from silane and oxygen to form a first layer having a thickness of from 2 to 5 microns;
   (c) coating said first layer by plasma enhanced chemical vapor deposition with a second layer, said second layer comprising a complex having a composition intermediate between $SiO_2$ and $Si_3N_4$ with a minimum of Si—Si bonds while the substrate is subjected to radio-frequency biasing.

3. The process according to claim 1 wherein the nitride compound of silicon contains silicon, hydrogen and nitrogen.

4. The process according to claim 1 wherein said second layer has a thickness of from 2 to 50 microns.

5. The process according to claim 1 further comprising depositing onto the activated surface a silicon-based under-layer by plasma enhanced chemical vapor deposition from silane.

6. The process according to claim 2 further comprising depositing onto said activated surface a silicon-based under-layer by plasma enhanced vapor chemical vapor deposition from silane.

7. The process according to claim 5 wherein at least one optical layer is deposited between said under-layer and said first layer.

8. The process according to claim 6 wherein at least one optical layer is deposited between said under-layer and said first layer.

9. The process according to claim 5 wherein the intermediate layer has a thickness of from 100 to 200 Angstroms.

10. The process according to claim 6 wherein said intermediate layer has a thickness of from 100 to 200 Angstroms.

11. The process according to claim 1 wherein the plasma activation of the surface is effected with a plasma selected from the group consisting of $Ar/O_2$ plasma and successive Ar and $Ar+NH_3$ plasmas.

12. The process according to claim 2 wherein the plasma activation of the surface is effected with a plasma selected from the group consisting of $Ar/O_2$ plasma and successive Ar and $Ar+NH_3$ plasmas.

13. The process according to claim 2 wherein the radio-frequency biasing of the substrate is performed so as to adjust the compressive stress of the layer at room temperature.

14. In a process for producing an optical structure comprising a silicon-based coating on an optical polymeric substrate comprising plasma-activating a surface of the substrate, depositing a first layer of $SiO_2$ onto the activated structure by plasma enhanced chemical vapor deposition technique from silane and oxygen to form a first layer;

the improvement comprising coating said first layer by a plasma enhanced chemical vapor deposition technique with a second layer formed from a silicon nitride compound while the substrate is subjected to radio-frequency biasing.

15. In a process for producing an optical structure comprising a silicon-based coating on an optical polymeric substrate comprising plasma-activating a surface of the substrate, depositing a first layer of $SiO_2$ onto the activated structure by plasma enhanced chemical vapor deposition technique from silane and oxygen to form a first layer;

the improvement comprising coating said first layer by a plasma enhanced chemical vapor deposition technique with a second layer of a complex composition which is intermediate between $SiO_2$ and $Si_3N_4$ with a minimum number of Si—Si bonds while the substrate is subjected to radio-frequency biasing.

* * * * *